UNITED STATES PATENT OFFICE.

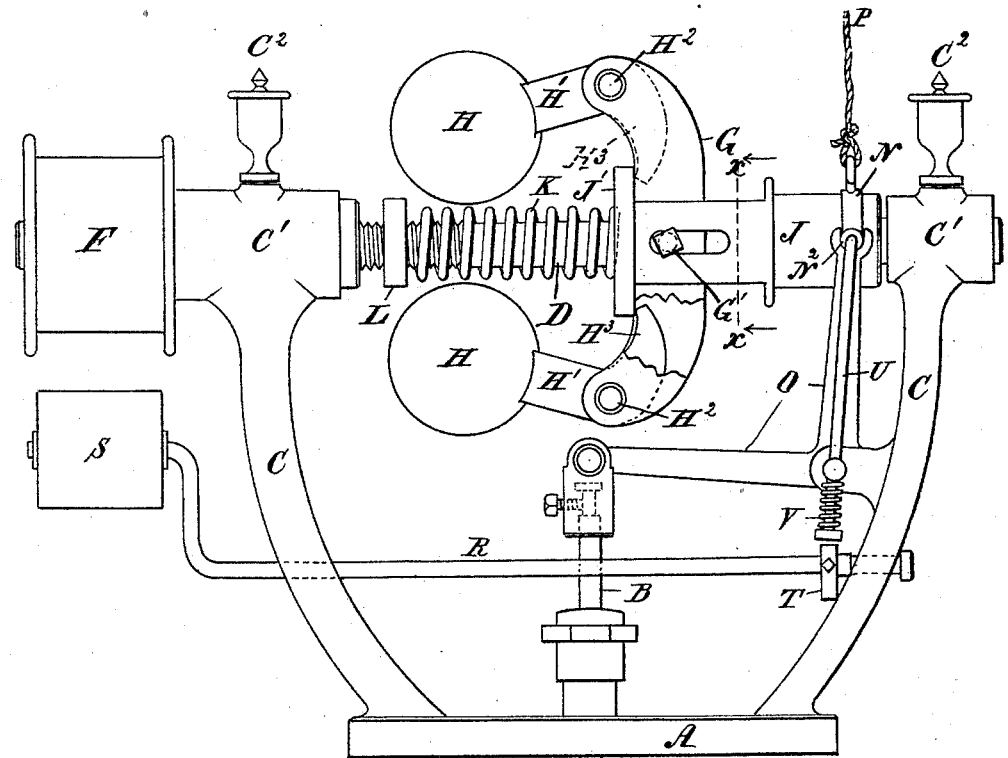

GEORGE H. EVANS, OF ST. JOHN, CANADA.

STEAM-ENGINE GOVERNOR.

SPECIFICATION forming part of Letters Patent No. 498,006, dated May 23, 1893.

Application filed February 16, 1893. Serial No. 462,640. (No model.) Patented in Canada November 26, 1892, No. 41,026.

*To all whom it may concern:*

Be it known that I, GEORGE H. EVANS, of the city of St. John, in the Province of New Brunswick, in the Dominion of Canada, have invented certain new and useful Improvements in Steam-Engine Governors, (for which I have obtained a patent of the Dominion of Canada, numbered 41,026, dated the 26th day of November, 1892, granted for eighteen years;) and I do hereby declare that the following is a full, clear, and exact description of the same, reference being had to the accompanying drawings, in which—

Figure 1, is a front elevation of my improved governor. Fig. 2, is a longitudinal section of a portion of the governor shaft, the sleeve reciprocating thereon, and transversely, the yoke connecting the ball-arms. Fig. 3, is a detail section on line X X Fig. 1, and, Fig. 4, is a detail section of parts to shut off steam by gravitation of an idler pulley when the governor belt breaks.

My invention has for its object to regulate the operation of the throttle valve by a governor having balls moving around and with a horizontal shaft provided with a pulley to drive the governor by a belt, said balls by their inward and outward centrifugal motion actuating the throttle valve by intermediate mechanism to regulate the supply of steam to the cylinder to obtain uniformity of speed, also, to effect disconnection of the governor and throttle from any part of a building by pull ropes or other like means, and to automatically effect disconnection should the governor belt break, by mechanism operated by the gravitation of an idler pulley running on said belt.

My invention consists in the construction and combination of parts composing the governor, as will be hereinafter described and specified in the claims.

A, is the head of the valve chamber or throttle, and B, the valve stem, having a vertical movement actuated by the governor.

C, C, are arms connected at one end to the head A, and the other ends of said arms terminate in journal bearings C', C', in alignment, and in said bearings is journaled the governor shaft D, lubricated by oil cups $C^2$.

F, is a belt pulley keyed on said shaft D, and is driven by a belt from the engine.

G, is a yoke sleeved on shaft D, and secured fixedly thereto by a binding screw G', and said yoke connects the arms H', of the balls H, by a hinged joint or pin $H^2$, and said arms have a curved and pointed extension $H^3$, terminating near the shaft D, and the yoke G, is grooved to receive said extensions, so that when the balls move outward the terminating points of said extensions will project from the face of the groove, for the purpose hereinafter referred to.

J, is a sleeve reciprocating on shaft D, and is internally enlarged to loosely fit over the yoke G, as shown in Fig. 2 in section, and said sleeve is provided with a flange J', at one end to cover the terminating points of the arm-extensions $H^3$, and said sleeve and yoke rotate with the shaft D.

The sleeve J, is provided with a slot to allow the binding screw G', to travel therein when the sleeve is reciprocated in one direction by the pressure of the terminating points of the ball-arm extensions $H^3$, when the balls move outwardly.

K, is a spiral spring surrounding the shaft D, and intervening the flange J', and a collar L, screwing on said shaft, so that by screwing the collar the tension of the spring can be regulated to force back the sleeve J, by the pressure of the spring on the flange J', and said flange presses on the terminal points of the ball-arms $H^3$, and moves the balls inwardly after they have been moved outwardly by centrifugal motion, and reciprocates the sleeve in the direction to check supply of steam to the cylinder of the steam engine.

N, is a saddle straddling a reduced portion of the sleeve J, or seated in a groove M, therein, and said saddle is provided with lugs $N^2$, diametrically opposite, to support pendently the U-shaped end of an elbow lever O, which is fulcrumed at the angle to one of the arms C, and the lower end of the lever connects with the valve stem B, so that when the speed is excessive, the balls move outwardly and the terminal points of the ball-arms move the sleeve J, against the resistance of the spiral spring K, and thereby force down the valve stem to check the supply of steam, and when the pressure of steam is less than the equilibrium, the spring K, overcomes the outward pressure of the balls and forces the sleeve J, to slide on shaft D, whereby the saddle moves the connected end of the lever, and causes the opposite end to lift the valve stem to admit more steam to the steam cylinder, to increase the speed, when the pressure is below the standard regulated by adjustment of the screw collar L.

When the speed of the engine suddenly rises, the balls H, H, fly out and the arm points $H^3$, reciprocate the sleeve J, to compress the spring K, thus restoring equilibrium, and the saddle N, follows the reciprocal motion of the sleeve, thereby permitting the valve stem B, to fall to lessen the supply of steam to the cylinder and diminishing the speed.

P, is a pull rope, chain or wire, attached at one end to the saddle N, and leading to any part of a building, and said saddle connects with the elbow lever O, as aforesaid, so that when the rope is pulled, the saddle is lifted from its seat on the sleeve J, and thereby operating the lever to shut off steam should the shafting require to be stopped from accidental or temporary cause.

As a means for shutting off steam should the governor belt break, the following described devices are employed.

R, is a shaft journaled to the arms C, C, and parallel to shaft D, and said shaft R, is provided with a crank at one end to extend over the governor driving belt, and said crank carries an idler pulley S, which rotates on said belt. The shaft R, near the opposite end from the crank, carries a cam T, which is out of contact when the idler pulley is on the belt.

U, is a yoke connecting the lugs on the opposite diametrical sides of the saddle, and extends downwardly to near the cam T. When the belt breaks, the idler pulley gravitates and rocks the shaft R, thereby bringing the cam T, into contact with the bottom of the yoke U, and lifts said yoke to cause the lever to operate to shut off steam.

V, V, are spiral springs to draw down the yoke to reseat the saddle after being lifted.

I claim as my invention—

1. The combination with the horizontal shaft D, carrying a belt pulley F, and journaled in arms C, C, supported by the valve head A, of the yoke G, sleeved on said shaft and rotating therewith, balls H, H, having arms H', pivoted to said yoke, said arms having a curved extension $H^3$, terminating near said shaft, a sleeve J, sliding reciprocally on said shaft and moved in one direction by the ball-arm extensions $H^3$, a spiral spring K, surrounding said shaft and moving said sleeve in the opposite direction, a saddle N, removable from and straddling said sleeve, and an elbow lever O, fulcrumed at the angle to one of the arms C, and connecting the saddle N, to the valve stem B, whereby the balls revolve in a vertical path around the rotating horizontal shaft, and the valve stem operated vertically, to regulate the supply of steam automatically as set forth for the purpose described.

2. The combination with the horizontal shaft D, carrying a belt pulley F, and journaled in arms C, C, supported by the valve head A, of the balls H, H, having curved arms H', hinged to a yoke G, keyed on said shaft, a reciprocating sleeve J, sliding on said shaft and moved in one direction by said arms, a spiral spring K, surrounding said shaft and moving said sleeve in the opposite direction, a saddle N, straddling said sleeve, a pull rope P, attached to said saddle and leading to any part of a building, an elbow lever O fulcrumed at the angle, and connecting said saddle to a valve stem B, of the throttle, whereby lifting the saddle by pulling the rope operates the lever, to shut off steam, as set forth.

3. The combination with the horizontal shaft D, carrying a driving belt pulley F, a yoke G, sleeved on said shaft and rotating therewith, governor balls H, H, having arms H', hinged to said yoke and moving with said shaft, a sleeve J, sliding on said shaft and operated in one direction by the ball-arms and in the opposite direction by a spiral spring K, surrounding said shaft, a saddle N, straddling said sleeve, an elbow lever O, connecting said saddle to a valve stem B, and a shaft R, journaled parallel to shaft D, and having at one end a crank carrying an idler pulley S, and the other end provided with a cam T, to engage and lift a yoke U, pendent from said saddle when the idler pulley gravitates, to operate the lever O, and shut off steam, as set forth.

GEORGE H. EVANS.

Witnesses:
AMON A. WILSON,
A. H. HANINGTON.